Figure 2:
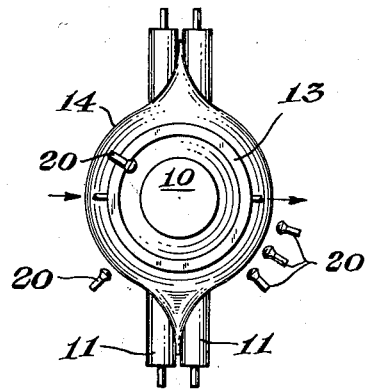

INVENTORS.
Harold G. Ahlich
Floyd L. Kreger
James L. Amos
BY Robert B. Ingraham
AGENT

United States Patent Office 3,157,720
Patented Nov. 17, 1964

3,157,720
METHOD AND APPARATUS FOR TRAPPED BUBBLE STRETCHING OF THERMOPLASTIC FILM
Harold G. Ahlich, Fairview Park, Ohio, and Floyd L. Kreger and James L. Amos, Midland, Mich., assignors to The Dow Chemical Company, Midland, Mich., a corporation of Delaware
Filed July 13, 1960, Ser. No. 42,603
8 Claims. (Cl. 264—95)

This invention relates to a method and certain accessory apparatus useful in the production of tubular alkenyl aromatic polymer film by the so-called trapped bubble process. It has particular reference to a method of treating a guide ring-stabilized bubble to obtain more uniform film thickness.

The invention is particularly adapted to the production of styrene polymer film or sheets by extrusion methods wherein a polymer, e.g., polystyrene, which may have an essentially linear molecular configuration is extruded as a tube and blown by means of a trapped bubble of gas. Polystyrene, or copolymers consisting predominantly of styrene, is employed herein as being generally representative of alkenyl aromatic polymers of the type that contain at least about 50 weight percent of at least one polymerized alkenyl aromatic compound or monomer having the general formula: Ar—CR=CH$_2$ wherein R is hydrogen or methyl and Ar is an aromatic radical, advantageously of the benzene series, of from 6 to 10 carbon atoms (including the carbon atoms in any ring subsituents on the aromatic nucleus). Thermoplastic polymers and copolymers of styrene and polymers and copolymers of alpha-methyl styrene, ar-methyl styrene (or vinyltoluene), the several mono- and dichlorostyrenes and ar-dimethyl styrenes, including copolymers thereof with such materials as vinylidene chloride and acrylonitrile; cross-linked, polyfunctional substances and divinyl benzene; and graft copolymers with other polymeric substances (such as other elastomeric polymers) may frequently be utilized with benefits commensurate with or in excess of those which are derivable from employment of polystyrene alone.

The principal procedure for preparing alkenyl aromatic polymer film is one which accomplishes the biaxial stretching. The process involves extrusion of the alkenyl aromatic resin in tubular form. A freshly extruded tube is inflated just after it leaves the orifice, and the air or other gas used for inflation is trapped between the extrusion die and a pair of pinch rolls. An internally cooled metal ring, of a diameter greater than that of the tube-forming orifice but smaller than the largest diameter of the distended tubular bubble, is positioned parallel to and coaxially with the extrusion orifice and spaced therefrom. The amount of trapped gas is selected to effect the desired radial distention of the tube, and the pinch rolls are caused to turn at a peripheral speed such as to accomplish a like amount of longitudinal stretching of the tubular film. Such a process yields a film product which has essentially the same degree of orientation and hence the same strength in the machine direction and transverse thereto.

The described trapped bubble process for making polystyrene film presents some difficulties, particularly in the matter of obtaining film of uniform thickness or "gauge." The length and diameter of the distended bubble are such as to make the bubble subject to variations in thickness caused by any slight movement of the surrounding atmosphere and also by minor variations in the spacing of the die lips of the annular extrusion orifice. Any localized temperature variation or uneven discharge from the die orifice gives rise to variation in thickness of the extruded material. In consequence, the finished film has areas which are relatively thin and others which are relatively thick. Means for avoiding the described difficulties are much to be desired, and it is the principal object of this invention to provide such means. Selective cooling of areas of the bubble by means of air streams has been tried as a means of controlling gauge variation but alkenyl aromatic film is much too temperature sensitive to respond favorably to this treatment.

The accessory apparatus of the present invention is used in the trapped bubble process for making a thermoplastic film comprising, in association with a tube-forming plastics extruder and a pair of pinch rolls disposed with their nip centered transversely on the extrusion centerline, a hollow metal ring of internal diameter greater than that of the orifice of the tube-forming extruder but smaller than that of an inflated film tube to be produced in the arrangement of the apparatus, said ring having an inlet and an outlet for circulation therein of liquid coolant, and having a smooth bearing surface circumferentially disposed along one edge of the inner face of said ring, to provide a single circumferential line of contact between the ring and such inflated film tube, the ring being mounted coaxially with the tube-forming extrusion die and spaced therefrom a short distance to serve as a guide for inflated plastic film tube during operation of the apparatus, and circumferentially disposed about the periphery of said inflated tube at least one source of radiant heat directed inwardly toward bubble.

Figure 1:
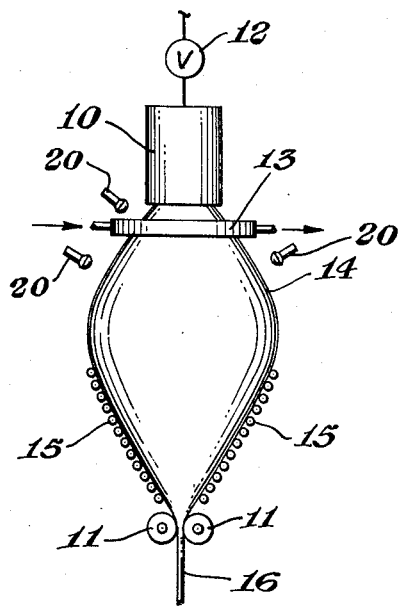

Further features and advantages of the invention will be more apparent in the following description and specification taken in connection with the accompanying drawing, wherein:

FIGURE 1 is a schematic flow diagram of the trapped bubble method of film production, showing the disposition of the guide ring and radiant heat sources; and FIGURE 2 is a schematic axial view of the extrusion head, bubble, and pinch rolls.

In the method illustrated in FIGURE 1, polystyrene is extruded at about 150° C. from a tube-forming die 10 illustrated as being downwardly directed and having a vertical axis. The tube is fed through the nip of pinch rolls 11 and is inflated by means of air supplied through valved line 12 which passes through die 10. Guide ring 13 is positioned beneath die 10, parallel to and coaxial therewith. A liquid coolant, at any temperature beneath the softening or second order transition point of the film-forming material is circulated through ring 13. The inflated tube 14 is in sliding contact with ring 13 and is cooled thereby promptly to a temperature such that the plastic material is no longer fluid and that it requires a positive application of force to complete its distention. Ring 13 is rigidly mounted, and it serves the added function of holding the inflated tube 14 symmetrically about the extrusion centerline. Further, to guide and stabilize the inflated tube 14, there may be provided two sets of parallel rollers 15 converging toward the nip between pinch rolls 11 so as to change gradually the cross-sectional shape of tube 14 from circular to elliptical with increasing eccentricity, until the collapsed tube is flattened by rolls 11. The flattened tube 16, after further cooling if required, may be slit to provide one or more flat films or it may be used in its tubular condition. Disposed about the periphery of the bubble and positioned somewhat below the cooled guide ring 13 are at least three sources of radiant heat indicated by the reference numeral 20.

FIGURE 2 depicts a schematic top view of the extruder head 10, the guide ring 13, the bubble 14, and pinch rolls 11, having radially disposed therein a plurality of sources of radiant heat 20.

A wide variety of sources of radiant heat 20 may be employed in the practice of the invention with 350 watt infrared heating lamps positioned 8 to 10 inches below the ring and 3 to 6 inches from the film bubble and connected to a source of variable voltage suited for the practice of the invention. Similarly, lower temperature sources may be employed, such as resistive strip heaters that operate below the visible range such as are commercially available under the trade designation "Chromalox." In a similar manner formed metal panels may be employed as a heat source, heated by induction heating, or similar means. In a typical operation a 350 watt infrared lamp is positioned approximately 6 inches from the film surface and 110 volts applied to the filament to reduce the film thickness from 0.0012 inch to 0.0010 inch. By moving the lamp within 3 inches of the film surface, the thickness was reduced from 0.0012 to 0.0008 inch.

Advantageously, the infrared heaters 20 may be mounted on a ring-like frame and are radially positioned at any location about the periphery of the bubble. It often is advantageous to employ a series of closely adjacent heat sources 20, such as illustrated in FIGURE 2 when appreciable area of the bubble must be reduced in thickness. The combination of adjustable input to the heat sources 20 and positioning the heat sources 20 at various distances from the periphery of the film presents a method and apparatus that provides extremely close thickness control in the finished product.

Particularly close control of the film thickness may be obtained by mounting radiant heat sources above and below the cooling ring 13. Thinning of the extruded tube 14 is accomplished by applying heat to the bubble 14 between the ring 13 and the extruder head 10. In this region the film is plastic, and substantially unoriented application of radiant heat to the bubble 14 after the material has passed the cooling ring 13 causes shrinkage and, therefore, increase in film thickness. In this region the film is oriented and is consequently heat shrinkable. Excessive heat applied to the thermoplastic tube at any point will result in its destruction. Advantageously, the heat sources 20 may be automatically controlled through conventional means by measurement of the film thickness.

In bubble extrusion of some thermoplastics, such as polyethylene, polyvinyl chloride, and the like, it is possible to employ an air ring for cooling the film by means of air blasts applied to the appropriate area of the bubble to reduce distention. When alkenyl aromatic resins are extruded, such an air blast cannot conveniently be employed as the cooling action is much too drastic and extremely difficult to control. It is believed that the temperature at which the alkenyl aromatic resin must be extruded and the temperature at which mechanical deformation of the bubble no longer takes place is too narrow to permit control of this method.

As is apparent, the method is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. The accessory apparatus for use in the trapped bubble process for making an oriented alkenyl aromatic resinous thermoplastic film comprising, in association with a tube-forming plastics extruder and a pair of pinch rolls disposed with their nip centered transversely on the extrusion centerline, a hollow metal ring of internal diameter greater than that of the orifice of the tube-forming extruder but smaller than that of an inflated film tube to be produced in the apparatus, said ring having an inlet and an outlet for circulation therein of liquid coolant, and having a smooth bearing surface circumferentially disposed along one edge of the inner face of said ring, to provide a single circumferential line of contact between the ring and such inflated film tube, the ring being mounted coaxially with the tube-forming extrusion die and spaced therefrom a short distance to serve as a guide for inflated plastic film tube during operation of the apparatus, and circumferentially disposed about the periphery of said inflated tube at least one source of radiant heat directed inwardly toward a selected portion of the periphery of said bubble to selectively heat said portion of said bubble and alter the thickness thereof.

2. The apparatus of claim 1, wherein said sources of radiant energy are mounted above and below said guide ring to reduce and increase the thickness of said selected portion of said bubble respectively.

3. The apparatus of claim 1, wherein said sources of radiant energy are infrared lamps.

4. The apparatus of claim 3, in operative combination with an extruded polystyrene bubble.

5. A method for the control of the thickness of an aromatic polymer film extruded by the trapped bubble process wherein a hollow metal ring of internal diameter greater than that of the orifice of the tube forming extruder, but smaller than that of the inflated tube to be produced, is in engagement with the expanding thermoplastic tube adjacent the die and provided with means to cool said ring and said tube, said ring being provided with means to cool said tube along the single circumferential line of contact with said inflated tube, the improvement which comprises selectively heating a portion of the periphery of said bubble to a temperature sufficient to alter the thickness thereof by means of radiant heat directed at a selected portion of said bubble.

6. The method of claim 5, wherein said heat is directed toward said bubble at a location between said ring and said die to cause thinning of the wall of said bubble.

7. The method of claim 5, wherein said radiant heat is directed toward the periphery of said bubble at a location adjacent said cooling ring and remote from said die to cause thickening of the wall of said bubble.

8. The method of claim 5, wherein a portion of said heat is directed toward said bubble at a location between said ring and said die to cause thinning of a portion of the wall of said bubble and the remaining portion of said heat is directed toward the periphery of said bubble at a location adjacent said cooling ring and remote from said die to cause thickening of a portion of the wall of said bubble.

References Cited in the file of this patent

UNITED STATES PATENTS

| | | |
|---|---|---|
| 2,354,658 | Barber | Aug. 1, 1944 |
| 2,412,187 | Wiley et al. | Dec. 3, 1946 |
| 2,832,994 | Ahlich et al. | May 6, 1958 |
| 2,862,234 | Gerber | Dec. 2, 1958 |
| 2,955,321 | Fortner et al. | Oct. 11, 1960 |